(12) United States Patent
Tamaki et al.

(10) Patent No.: US 10,737,598 B2
(45) Date of Patent: Aug. 11, 2020

(54) SEAT AND VEHICLE

(71) Applicant: HONDA MOTOR CO., LTD., Minato-Ku, Tokyo (JP)

(72) Inventors: Hidekazu Tamaki, Wako (JP); Takumi Sato, Wako (JP); Hideki Hitomi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/213,309

(22) Filed: Dec. 7, 2018

(65) Prior Publication Data

US 2019/0176667 A1 Jun. 13, 2019

(30) Foreign Application Priority Data

Dec. 11, 2017 (JP) .................................. 2017-236962

(51) Int. Cl.
| | |
|---|---|
| *B60N 2/64* | (2006.01) |
| *B60N 2/70* | (2006.01) |
| *A47C 7/18* | (2006.01) |
| *A47C 27/14* | (2006.01) |
| *B60N 2/90* | (2018.01) |

(52) U.S. Cl.
CPC ................ *B60N 2/64* (2013.01); *A47C 7/185* (2013.01); *A47C 27/148* (2013.01); *B60N 2/646* (2013.01); *B60N 2/7094* (2013.01); *B60N 2/986* (2018.02)

(58) Field of Classification Search
CPC .......... B60N 2/222; B60N 2/64; B60N 2/646; B60N 2/7029; B60N 2/7052; B60N 2/707; B60N 2/986; B60N 2205/20; B60N 2/2222; B60N 2/7094; A47C 7/185; A47C 27/062; A47C 27/148

USPC ......................................... 297/452.37, 452.55
See application file for complete search history.

(56) References Cited

U.S. PATENT DOCUMENTS

| | | | | | |
|---|---|---|---|---|---|
| 5,024,485 | A | * | 6/1991 | Berg ...................... | A47C 3/025 297/270.1 |
| 5,499,413 | A | * | 3/1996 | Van Hekken ............ | A47C 3/12 297/452.17 |
| 5,564,144 | A | * | 10/1996 | Weingartner ............ | A47C 7/26 297/452.27 |

(Continued)

FOREIGN PATENT DOCUMENTS

| | | | |
|---|---|---|---|
| EP | 1162108 A1 * | 12/2001 | ............... B60N 2/70 |
| JP | S61-234806 A | 10/1986 | |

(Continued)

OTHER PUBLICATIONS

Office Action dated May 21, 2019 issued over the corresponding Japanese Patent Application No. 2017-236962 with the English translation thereof.

*Primary Examiner* — Ryan D Kwiecinski
(74) *Attorney, Agent, or Firm* — Carrier Blackman & Associates, P.C.; William D. Blackman; Joseph P. Carrier

(57) ABSTRACT

A seat back of a seat includes: a seat back frame; a front side elastic member positioned on a user side; a rear side elastic member disposed more rearward than the front side elastic member is; and a pressure receiving member disposed at a rear of the rear side elastic member. The rear side elastic member has a lower resilience than the front side elastic member. The pressure receiving member supports the front side elastic member and the rear side elastic member while being supported by the seat back frame.

11 Claims, 7 Drawing Sheets

(56) References Cited

U.S. PATENT DOCUMENTS

| | | | |
|---|---|---|---|
| 8,215,714 B2* | 7/2012 | Galbreath | B60N 2/70 297/452.27 |
| 9,925,899 B2* | 3/2018 | Mogi | B60N 2/5642 |
| 2010/0176633 A1* | 7/2010 | Brncick | B60N 2/585 297/228.11 |
| 2015/0175042 A1* | 6/2015 | Galbreath | B60N 2/64 297/452.48 |
| 2015/0367762 A1* | 12/2015 | Yasuda | B60N 2/686 297/216.14 |
| 2018/0056836 A1* | 3/2018 | Schacht | B60N 2/70 |

FOREIGN PATENT DOCUMENTS

| | | | |
|---|---|---|---|
| JP | 10-181400 A | | 7/1998 |
| JP | 11-018886 A | | 1/1999 |
| JP | 2005-254962 A | | 9/2005 |
| JP | 2007-210391 A | | 8/2007 |
| JP | 2016-007936 A | | 1/2016 |
| KR | 20040019785 A | * | 3/2004 |

\* cited by examiner

SEAT AND VEHICLE

CROSS-REFERENCE TO RELATED APPLICATION

This application is based upon and claims the benefit of priority from Japanese Patent Application No. 2017-236962 filed on Dec. 11, 2017, the contents of which are incorporated herein by reference.

BACKGROUND OF THE INVENTION

Field of the Invention

The present invention relates to a seat that includes a seat back having a seat back frame and an elastic member, and to a vehicle including the seat.

Description of the Related Art

Japanese Laid-Open Patent Publication No. 2016-007936 attempts to solve the problem of providing a seat-for-vehicle that by a configuration including a seat back frame made of a resin, contributes to an improvement in occupant protecting performance during a rear end collision while securing comfort of a sitting occupant at a normal time (reference paragraph [0006], Abstract). In order to solve the problem, a seat-for-vehicle of Japanese Laid-Open Patent Publication No. 2016-007936 (Abstract) includes: a seat back frame made of a resin; a headrest; a seat back pad; a lattice-shaped spring body; and an impact absorbing member (a load transmitting section).

The lattice-shaped spring body disclosed by the reference is formed in a lattice shape by wire, and is attached to the seat back frame on a seat front side of a back panel section. Moreover, the lattice-shaped spring body elastically supports the seat back pad from a seat rear side, and has a space formed between itself and the back panel section. The impact absorbing member (the load transmitting section) is disposed within the space by being attached to the lattice-shaped spring body, projects to a back panel section side, and has a gap formed between itself and the back panel section.

SUMMARY OF THE INVENTION

In the above-described kind of Japanese Laid-Open Patent Publication No. 2016-007936, the gap 52 is understood to be formed between the impact absorbing member (the load transmitting section) 28 and the back panel section 20B during normal use. Since, for example, in paragraph [0009], there is a description of the impact absorbing member 28 approaching the back panel section 20B during a rear end collision, then it means that during normal use, the two are not in contact. Therefore, during normal use, the impact absorbing member (the load transmitting section) 28 does not contribute to suppression of vibration to the occupant from the seat frame. In such a Japanese Laid-Open Patent Publication No. 2016-007936, there is room for improving a level of sitting comfort of a user by reducing the vibration transmitted to the user from the seat frame.

The present invention has been made considering the above-described kinds of problems, and has an object of providing a seat that enables a level of sitting comfort of a user to be improved, and of providing a vehicle including the seat.

A seat according to the present invention includes a seat back, the seat back including:
a seat back frame;
a front side elastic member positioned on a user side;
a rear side elastic member which has a lower resilience than the front side elastic member and which is disposed more rearward than the front side elastic member is; and
a pressure receiving member configured to, while being supported by the seat back frame, support the front side elastic member and the rear side elastic member at a rear of the rear side elastic member.

Due to the present invention, a rear side elastic member of lower resilience than a front side elastic member on a user side, is disposed between the front side elastic member and a pressure receiving member. As a result, even if the seat back frame or the pressure receiving member vibrates, vibration transmission to the front side elastic member is suppressed by action of the rear side elastic member. Therefore, vibration transmitted to a user decreases, so it becomes possible for a level of sitting comfort of the user to be improved.

Moreover, it is also conceivable for the rear side elastic member alone to be employed, instead of employing the front side elastic member. However, there is a risk that with the rear side elastic member alone, the user, in the case of being the driver, for example, will over-relax due to a low resilience of the rear side elastic member. In the present invention, the front side elastic member is disposed closer to the user side than the low resilience rear side elastic member is. This makes it possible for a selection scope of the front side elastic member to be broadened.

The front side elastic member may be of a urethane material, for example. Moreover, the rear side elastic member may be of a low resilience urethane material (or a low resilience urethane foam material) having a lower resilience than the urethane material of the front side elastic member. Since the low resilience urethane material is softer than the urethane material, it is difficult for left-right vibration of the seat back frame to be transmitted to the urethane (and the user). Therefore, it becomes possible for the level of sitting comfort of the user to be improved.

Alternatively, the rear side elastic member may be a rubber sheet. As a result, attachment work of the rear side elastic member becomes easy.

A plate which is harder than the front side elastic member and the rear side elastic member, may be disposed between the front side elastic member and the rear side elastic member. This makes it possible to stabilize a relative positional relationship of the front side elastic member and the rear side elastic member.

The seat may include a side support disposed at a side of the rear side elastic member. Moreover, a gap may be provided between the rear side elastic member and the side support. This makes it difficult for the low resilience rear side elastic member to contact the side support when the seat back frame vibrates in a left-right direction. Therefore, it becomes easy for the rear side elastic member to undergo displacement, and it becomes possible for transmission of vibration to the side support to be suppressed and for the level of sitting comfort of the user to be improved.

The side support may include:
a user side elastic member positioned on the user side; and
a frame side elastic member which has a lower resilience than the user side elastic member and which is disposed between the user side elastic member and the seat back frame.

Due to the present invention, a frame side elastic member of lower resilience than a user side elastic member on the user side, is disposed between the user side elastic member and the seat back frame. As a result, even if the seat back frame vibrates, vibration transmission to the user side elastic member is suppressed by action of the frame side elastic member. Therefore, vibration transmitted to the user decreases, so it becomes possible for the level of sitting comfort of the user to be improved.

Moreover, it is also conceivable for the frame side elastic member alone to be employed, instead of employing the user side elastic member. However, there is a risk that if, for example, materials of the front side elastic member of the seat back and the frame side elastic member are made to differ greatly, then a feeling of discomfort will be caused in the user. In the present invention, the user side elastic member is disposed closer to the user side than the low resilience frame side elastic member is. This makes it possible for a selection scope of the frame side elastic member to be broadened, by such means as configuring the material of the user side elastic member to be the same as that of the front side elastic member.

The front side elastic member and the user side elastic member may be configured from a same material. Moreover, the rear side elastic member and the frame side elastic member may be configured from a same material. This makes it possible to achieve a cost reduction while obtaining the above-described kind of vibration reduction effect.

A vehicle according to the present invention includes the seat.

The present invention makes it possible to improve a level of sitting comfort of a user.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A. First Embodiment

A-1. Configuration

[A-1-1. Overall Configuration]

Figure 1:
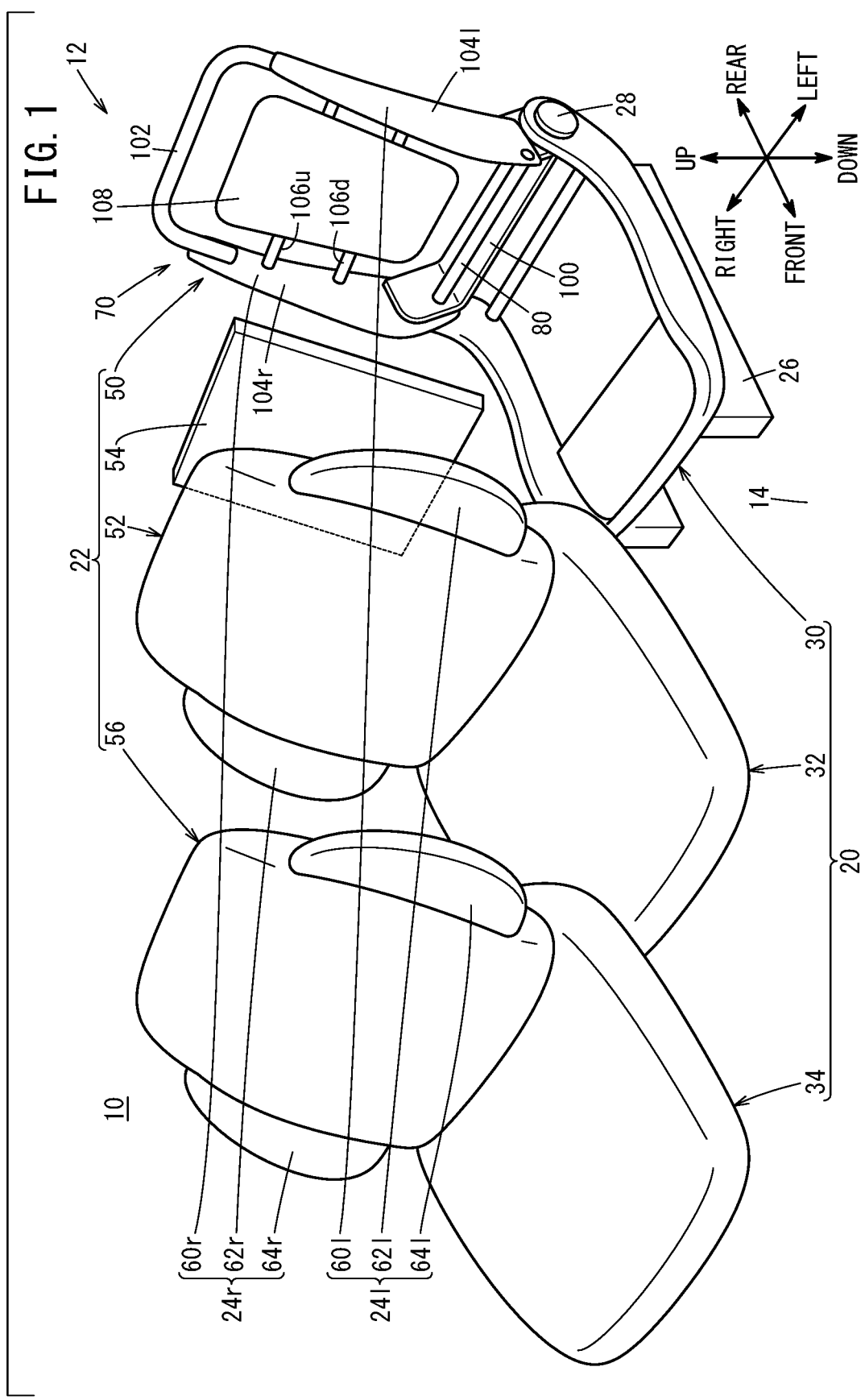
FIG. 1 is an exploded perspective view in which a seat according to a first embodiment of the present invention is shown schematically, viewed obliquely from the front.
Figure 2:
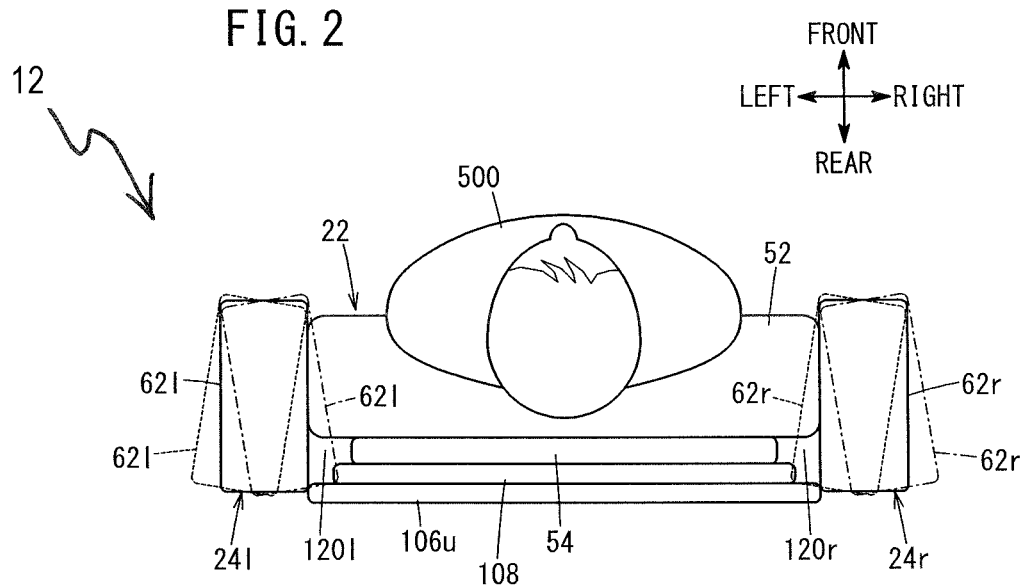
FIG. 2 is a plan view in which part of the seat of the first embodiment is simplified.

FIG. 1 is an exploded perspective view in which a seat 12 according to a first embodiment of the present invention is shown schematically, viewed obliquely from the front. FIG. 2 is a plan view in which part of the seat 12 of the first embodiment is simplified. It should be noted that in FIG. 2 and later-mentioned FIGS. 3-5, a second skin member 56, third skin members 64l, 64r, and so on, shown in FIG. 1 are omitted. As shown in FIG. 1, the seat 12 is disposed on a floor 14 of a vehicle 10, and includes a seat cushion 20, a seat back 22, side supports 24l, 24r, a slide mechanism 26, and a reclining mechanism 28.

The seat cushion 20 includes a cushion frame 30, a first elastic member 32, and a first skin member 34. The seat back 22 includes a seat back frame 50, a second elastic member 52 (a front side elastic member), a third elastic member 54 (a rear side elastic member), and the second skin member 56. The side supports 24l, 24r include side support frames 60l, 60r, fourth elastic members 62l, 62r, and the third skin members 64l, 64r. The cushion frame 30, the seat back frame 50, and the side support frames 60l, 60r configure a seat frame 70.

The first elastic member 32, the second elastic member 52, and the fourth elastic members 62l, 62r are of a resin material such as a urethane material, for example. Moreover, the third elastic member 54 is of a material of lower resilience than that of the second elastic member 52 (here, a low resilience urethane material). The first skin member 34, the second skin member 56, and the third skin members 64l, 64r are made of synthetic leather, for example.

The slide mechanism 26 slides the seat cushion 20, the seat back 22, the side supports 24l, 24r, and the reclining mechanism 28 in a front-rear direction of the vehicle 10, in response to operation of a user 500 (FIG. 2) as an occupant.

The reclining mechanism 28 changes an inclination of the seat back 22 and the side supports 24l, 24r, centered on a spindle 80, in response to operation of the user 500.

[A-1-2. Seat Back 22]

(A-1-2-1. Seat Back Frame 50)

The seat back frame 50 supports the second elastic member 52 and the third elastic member 54 (FIG. 1). As shown in FIG. 1, the seat back frame 50 includes a lower frame 100, an upper frame 102, two side frames 104l, 104r, a lower-side support bar 106d, an upper-side support bar 106u, and a pressure receiving member 108.

The lower-side support bar 106d and the upper-side support bar 106u extend in a left-right direction of the vehicle 10 between the side frames 104l, 104r, thereby supporting the pressure receiving member 108. The pressure receiving member 108 supports the second elastic member 52 and the third elastic member 54 from the rear (a back side), and receives a pressure from a back of the user 500. The pressure receiving member 108 is supported by the seat back frame 50 (specifically, the lower-side support bar 106d and the upper-side support bar 106u). A position of the pressure receiving member 108 is substantially a center in the left-right direction of the seat 12.

(A-1-2-2. Second Elastic Member 52 and Third Elastic Member 54)

As shown in FIG. 2, the second elastic member 52 is disposed closer to a user 500 side than the third elastic member 54 is, to the rear of the user 500. The second elastic member 52 mainly has its resilience set considering a level of sitting comfort of the user 500, and there may be utilized as the second elastic member 52 an elastic member employed in a standard vehicle.

The third elastic member 54 is disposed on a rear side of the second elastic member 52 and a front side of the pressure receiving member 108, to the rear of the user 500. The third elastic member 54 mainly has its resilience set with a purpose of suppressing vibration transmission to the second elastic member 52 from the seat back frame 50 or the pressure receiving member 108. In other words, the third elastic member 54 functions as a spring element. As described above, the third elastic member 54 is of a urethane material of lower resilience than that of the second elastic member 52.

[A-1-3. Side Supports 24*l*, 24*r*]

The side supports 24*l*, 24*r* (the fourth elastic members 62*l*, 62*r*) are disposed at the sides of the seat back 22. As shown in FIG. 2, gaps 120*l*, 120*r* are provided between the third elastic member 54 and the side supports 24*l*, 24*r*.

In FIG. 2, the fourth elastic members 62*l*, 62*r* are shown by solid lines, broken lines, and one dot-chain lines. This indicates a state of the fourth elastic members 62*l*, 62*r* vibrating in the left-right direction. In the first embodiment, since the gaps 120*l*, 120*r* exist between the third elastic member 54 and the side supports 24*l*, 24*r*, then, even if the fourth elastic members 62*l*, 62*r* vibrate to left and right, they will not contact the pressure receiving member 108 or the third elastic member 54.

A-2. Advantages of First Embodiment

Due to the first embodiment as described above, the third elastic member 54 (the rear side elastic member) which is of lower resilience than the second elastic member 52 (the front side elastic member) on the user 500 side, is disposed between the second elastic member 52 and the pressure receiving member 108 (FIGS. 1 and 2). As a result, even if the seat back frame 50 or the pressure receiving member 108 vibrates, vibration transmission to the second elastic member 52 is suppressed by action of the third elastic member 54. Therefore, vibration transmitted to the user 500 decreases, so it becomes possible for the level of sitting comfort of the user 500 to be improved.

Moreover, it is also conceivable for the third elastic member 54 alone to be employed, instead of employing the second elastic member 52. However, there is a risk that with the third elastic member 54 alone, the user 500, in the case of being the driver, for example, will over-relax due to a low resilience of the third elastic member 54. In the first embodiment, the second elastic member 52 is disposed closer to the user 500 side than the low resilience third elastic member 54 is (FIGS. 1 and 2). This makes it possible for a selection scope of the second elastic member 52 to be broadened.

In the first embodiment, the second elastic member 52 (the front side elastic member) is of a urethane material. Moreover, the third elastic member 54 (the rear side elastic member) is of a low resilience urethane material having a lower resilience than the urethane material of the second elastic member 52. Since the low resilience urethane material is softer than the urethane material, it is difficult for left-right vibration of the seat back frame 50 to be transmitted to the urethane material (the user 500). Therefore, the level of sitting comfort of the user 500 improves.

In the first embodiment, the seat 12 includes the side supports 24*l*, 24*r* disposed at the sides of the third elastic member 54 (the rear side elastic member) (FIGS. 1 and 2). Moreover, the gaps 120*l*, 120*r* are provided between the third elastic member 54 and the side supports 24*l*, 24*r* (FIG. 2). This makes it difficult for the low resilience third elastic member 54 to contact the side supports 24*l*, 24*r* when the seat back frame 50 vibrates in the left-right direction. Therefore, it becomes easy for the third elastic member 54 to undergo displacement, and it becomes possible for transmission of vibration to the side supports 24*l*, 24*r* to be suppressed and for the level of sitting comfort of the user 500 to be improved.

B. Second Embodiment

B-1. Configuration (Differences from First Embodiment)

Figure 3:
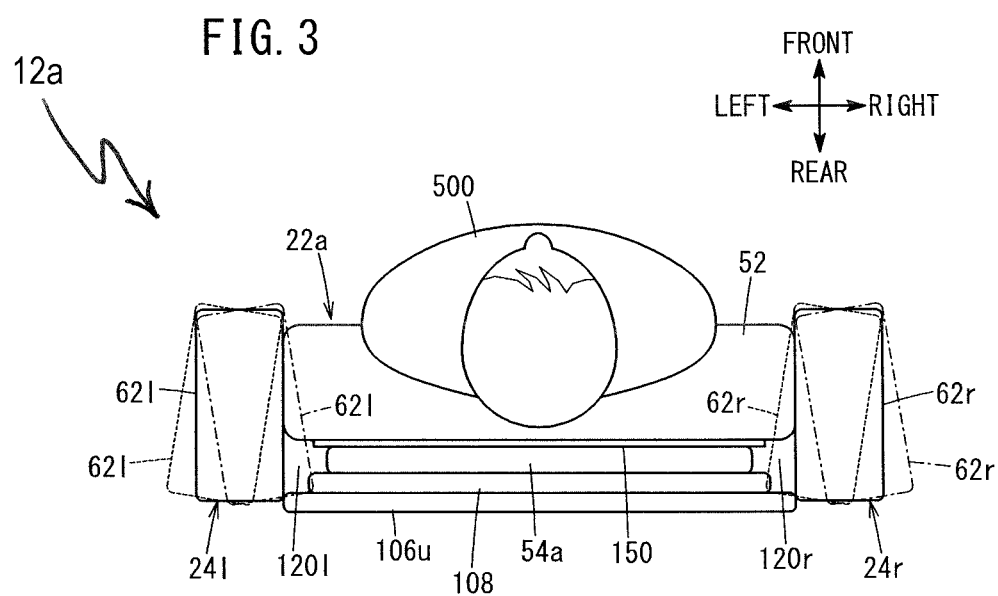
FIG. 3 is a plan view in which part of a seat of a second embodiment is simplified.

FIG. 3 is a plan view in which part of a seat 12*a* of a second embodiment is simplified. The seat 12*a* of the second embodiment basically has a similar configuration to the seat 12 of the first embodiment. Hereafter, configuring elements of the second embodiment that are similar to the configuring elements of the first embodiment will be assigned with the same reference symbols, and detailed descriptions thereof will be omitted.

In the first embodiment, the third elastic member 54 of the seat back 22 is of a low resilience urethane material. In contrast, in the second embodiment, a third elastic member 54*a* (a spring element) of a seat back 22*a* is a rubber sheet. Moreover, a plate 150 which is harder than the second elastic member 52 and the third elastic member 54*a*, is disposed between the second elastic member 52 and the third elastic member 54*a* (FIG. 3). The plate 150 is made of a metal such as aluminum, for example. Alternatively, the plate 150 may be configured made from a fiber reinforced plastic (FRP).

B-2. Advantages of Second Embodiment

Due to the second embodiment, the following advantages can be achieved, in addition to or in place of those of the first embodiment.

That is, in the second embodiment, the third elastic member 54*a* (the rear side elastic member) is a rubber sheet. As a result, attachment work becomes easy.

In the second embodiment, the plate 150 which is harder than the second elastic member 52 (the front side elastic member) and the third elastic member 54*a* (the rear side elastic member), is disposed between the second elastic member 52 and the third elastic member 54*a* (FIG. 3). This makes it possible to stabilize a relative positional relationship of the second elastic member 52 and the third elastic member 54*a*.

C. Third Embodiment

C-1. Configuration (Differences from First and Second Embodiments)

Figure 4:
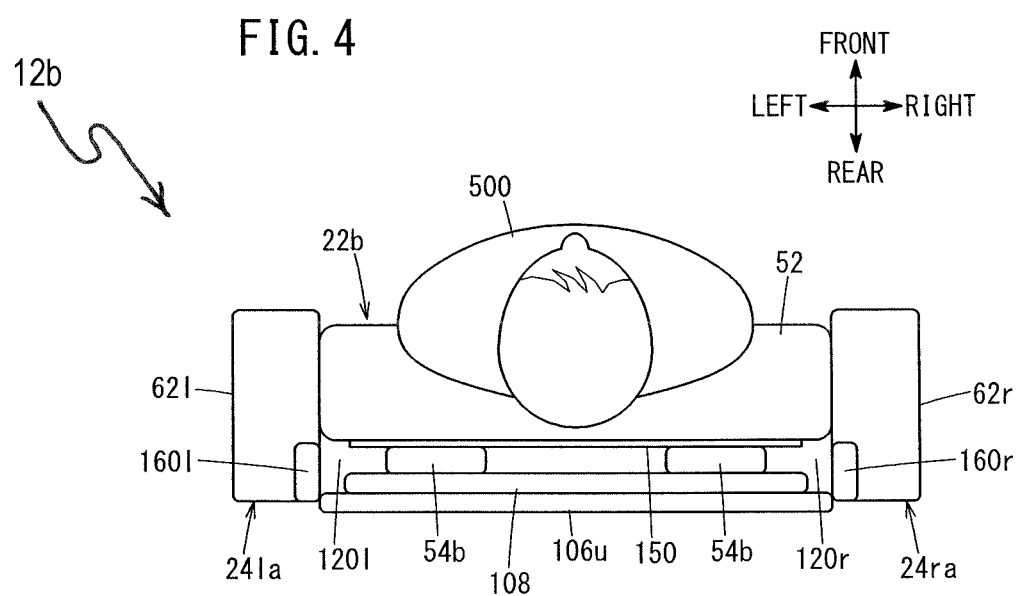
FIG. 4 is a plan view in which part of a seat of a third embodiment is simplified.

FIG. 4 is a plan view in which part of a seat 12*b* of a third embodiment is simplified. The seat 12*b* of the third embodiment basically has a similar configuration to the seats 12, 12*a* of the first and second embodiments. Hereafter, configuring elements of the third embodiment that are similar to the configuring elements of the first and second embodiments will be assigned with the same reference symbols, and detailed descriptions thereof will be omitted.

In the first embodiment, the third elastic member 54 of the seat back 22 is of a low resilience urethane material, and in the second embodiment, the third elastic member 54*a* of the seat back 22*a* is a rubber sheet. In contrast, in the third embodiment, a third elastic member 54*b* (a spring element) of a seat back 22*b* is a plurality of coil springs. The coil springs have a lower resilience than the urethane material of the second elastic member 52. Alternatively, from a viewpoint of suppressing vibration transmission to the second elastic member 52 from the seat back frame 50 or the pressure receiving member 108, it is also possible for the coil springs to be configured having a higher resilience than the urethane material of the second elastic member 52. Moreover, it is also possible for a different kind of spring (for example, a plate spring) to be employed instead of the coil springs.

Similarly to in the second embodiment, the plate 150 which is harder than the second elastic member 52 and the third elastic member 54b, is disposed between the second elastic member 52 and the third elastic member 54b (FIG. 4).

The side supports 24l, 24r of the first and second embodiments include the fourth elastic members 621, 62r as elastic members (FIG. 1). In contrast, side supports 24la, 24ra of the third embodiment include fifth elastic members 1601, 160r (frame side elastic members), in addition to the fourth elastic members 621, 62r (user side elastic members). As shown in FIG. 4, the fourth elastic members 621, 62r are positioned closer to the user 500 side, and have a distance to the user 500 which is shorter, compared to the fifth elastic members 1601, 160r. In other words, although the user 500 sometimes leans on the fourth elastic members 621, 62r via the third skin members 641, 64r, the user 500 does not lean on the fifth elastic members 1601, 160r.

As described above, the fourth elastic members 621, 62r are configured from a similar material to the first elastic member 32 and the second elastic member 52. In contrast, the fifth elastic members 1601, 160r are configured from a similar material to the third elastic member 54b. In other words, the fifth elastic members 1601, 160r are of lower resilience than the fourth elastic members 621, 62r, and, specifically, are configured from a low resilience urethane material. Alternatively, the fifth elastic members 1601, 160r may be configured from a rubber sheet, similarly to the third elastic member 54a of the second embodiment.

C-2. Advantages of Third Embodiment

Due to the third embodiment, the following advantages can be achieved, in addition to or in place of those of the first and second embodiments.

That is, in the third embodiment, the third elastic member 54b (the rear side elastic member) as the coil springs is disposed between the second elastic member 52 (the front side elastic member) and the seat back frame 50 (FIG. 4). This makes it possible for vibration transmission to the second elastic member 52 from the seat back frame 50 or the pressure receiving member 108 to be suppressed by bending of the third elastic member 54b.

In the third embodiment, the seat 12 includes the side supports 24la, 24ra disposed at the sides of the third elastic member 54b (the rear side elastic member) (FIG. 4). The side supports 24la, 24ra include: the fourth elastic members 621, 62r (the user side elastic members) positioned on the user 500 side; and the fifth elastic members 1601, 160r (the frame side elastic members) that are of lower resilience than the fourth elastic members 621, 62r and are disposed between the fourth elastic members 621, 62r and the seat back frame 50.

Due to the third embodiment, the fifth elastic members 1601, 160r which are of lower resilience than the fourth elastic members 621, 62r on the user 500 side, are disposed between the fourth elastic members 621, 62r and the seat back frame 50. As a result, even if the seat back frame 50 vibrates, vibration transmission to the fourth elastic members 621, 62r is suppressed by action of the fifth elastic members 1601, 160r. Therefore, vibration transmitted to the user 500 decreases, so it becomes possible for the level of sitting comfort of the user 500 to be improved.

Moreover, it is also conceivable for the fifth elastic members 1601, 160r alone to be employed, instead of employing the fourth elastic members 621, 62r. However, there is a risk that if, for example, the fifth elastic members 1601, 160r are configured to be of a low resilience urethane material when the second elastic member 52 is of a urethane material which is not of low resilience, then a feeling of discomfort will be caused in the user 500. In the third embodiment, the fourth elastic members 621, 62r are disposed closer to the user 500 side than the low resilience fifth elastic members 1601, 160r are (FIG. 4). This makes it possible for a selection scope of the fifth elastic members 1601, 160r to be broadened, by such means as configuring the material of the fourth elastic members 621, 62r to be the same as that of the second elastic member 52.

D. Fourth Embodiment

D-1. Configuration (Differences from First Through Third Embodiments)

Figure 5:
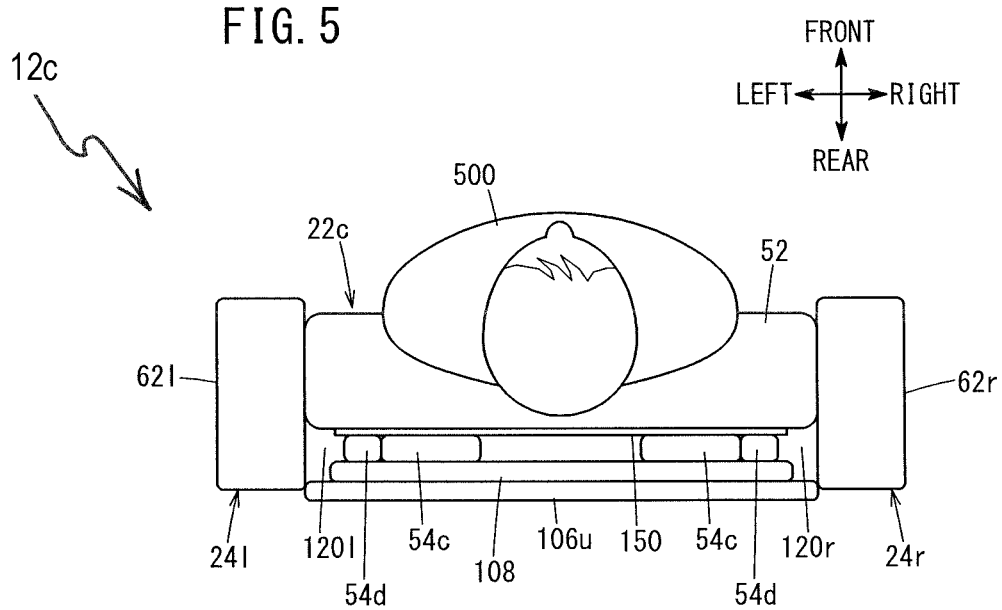
FIG. 5 is a plan view in which part of a seat of a fourth embodiment is simplified.

FIG. 5 is a plan view in which part of a seat 12c of a fourth embodiment is simplified. The seat 12c of the fourth embodiment basically has a similar configuration to the seats 12, 12a, 12b of the first through third embodiments. Hereafter, configuring elements of the fourth embodiment that are similar to the configuring elements of the first through third embodiments will be assigned with the same reference symbols, and detailed descriptions thereof will be omitted.

In the seat backs 22, 22a, 22b of the first through third embodiments, single kinds of the third elastic members 54, 54a, 54b were disposed between the second elastic member 52 and the pressure receiving member 108 (FIGS. 1-4). In contrast, in a seat back 22c of the fourth embodiment, two kinds of third elastic members 54c, 54d are disposed between the second elastic member 52 and the pressure receiving member 108 (FIG. 5). The third elastic member 54c is a coil spring, similarly to the third elastic member 54b of the third embodiment. The third elastic member 54d is of a low resilience urethane material, similarly to the third elastic member 54 of the first embodiment. One of the third elastic members 54c, 54d may be configured as a rubber sheet.

D-2. Advantages of Fourth Embodiment

Due to the fourth embodiment, the following advantages can be achieved, in addition to or in place of those of the first through third embodiments.

That is, in the fourth embodiment, the two kinds of third elastic members 54c, 54d are disposed between the second elastic member 52 and the pressure receiving member 108 (FIG. 5). This makes it possible for the two kinds of third elastic members 54c, 54d to respectively reduce vibrations of different frequency regions. Therefore, a vibration reduction effect can be improved.

E. Vibration Reduction Effect of Third Elastic Member 54, and so on

Next, vibration reduction effects of the third elastic members 54, 54a, 54b, 54c, 54d will be described in more detail.

Figure 6A:
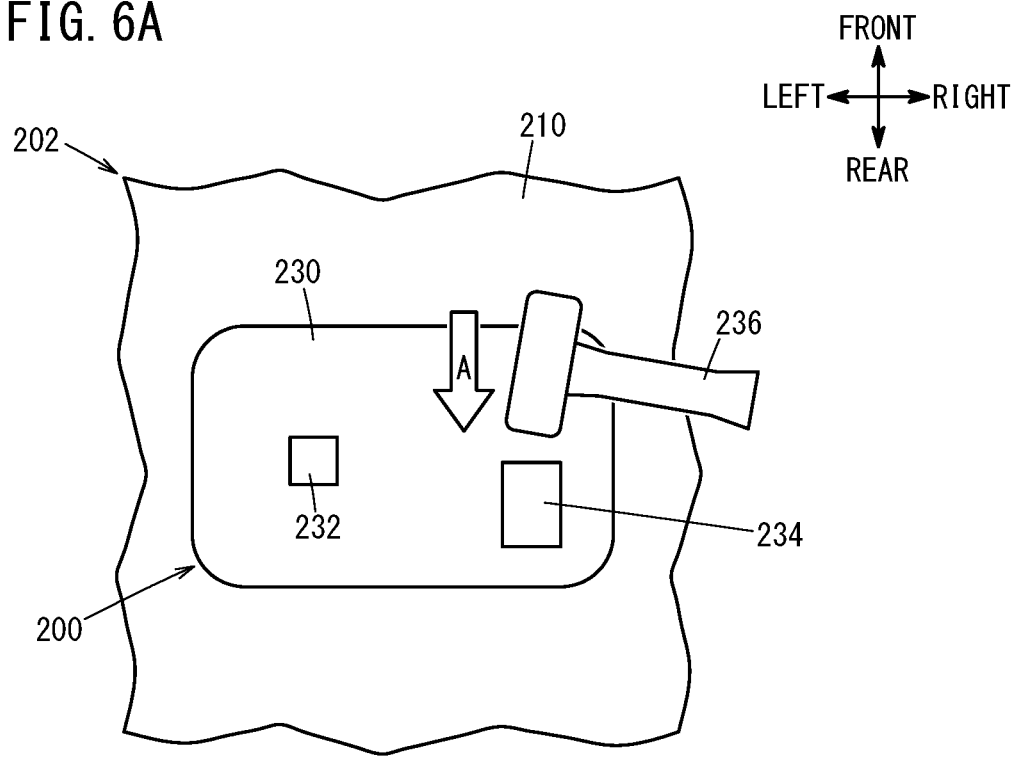
FIG. 6A is a plan view showing a testing device for testing a vibration reduction effect, and a workpiece.
Figure 6B:
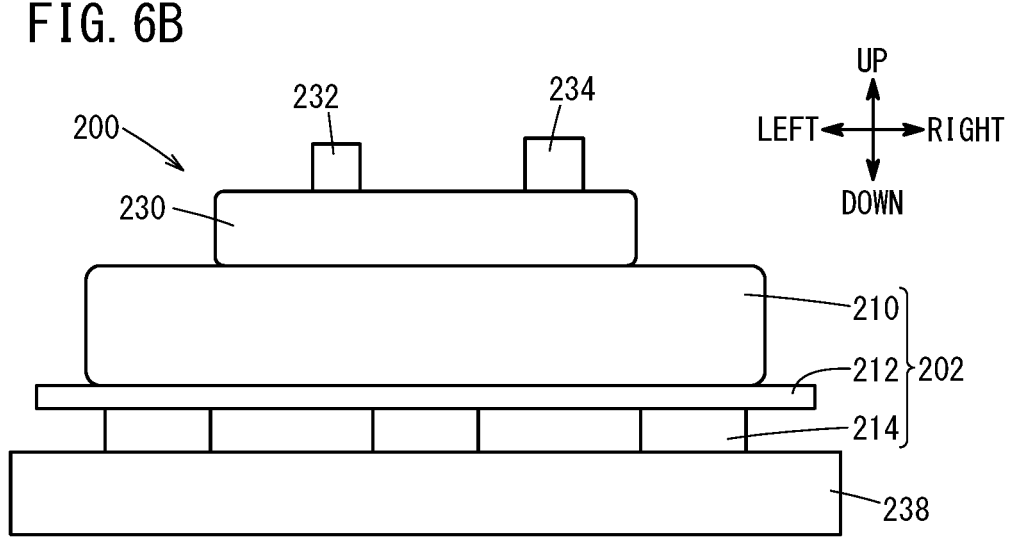
FIG. 6B is a rear view showing the testing device for testing a vibration reduction effect, and the workpiece.

FIG. 6A is a plan view showing a testing device 200 for testing a vibration reduction effect, and a workpiece 202, and FIG. 6B is a rear view showing the testing device 200 for testing a vibration reduction effect, and the workpiece 202. As shown in FIG. 6B, the workpiece 202 includes a first test elastic member 210, a plate 212, and a second test elastic member 214.

The first test elastic member 210 is an elastic member (of a urethane material) the same as the first elastic member 32, the second elastic member 52, and the fourth elastic members 62l, 62r, and has a rectangular parallelepiped shape. The plate 212 is hard, similarly to the plate 150. The second test elastic member 214 is a rubber sheet similar to the third elastic member 54a of the second embodiment (FIG. 3). Therefore, the workpiece 202 has a similar configuration to the seat 12a of the second embodiment.

Moreover, a first comparative workpiece (not illustrated) without the first test elastic member 210, the plate 212, and the second test elastic member 214, is prepared as a first comparative example. Furthermore, a second comparative workpiece (not illustrated) that includes the plate 212 and the second test elastic member 214, but does not include the first test elastic member 210, is prepared as a second comparative example.

Figure 7:
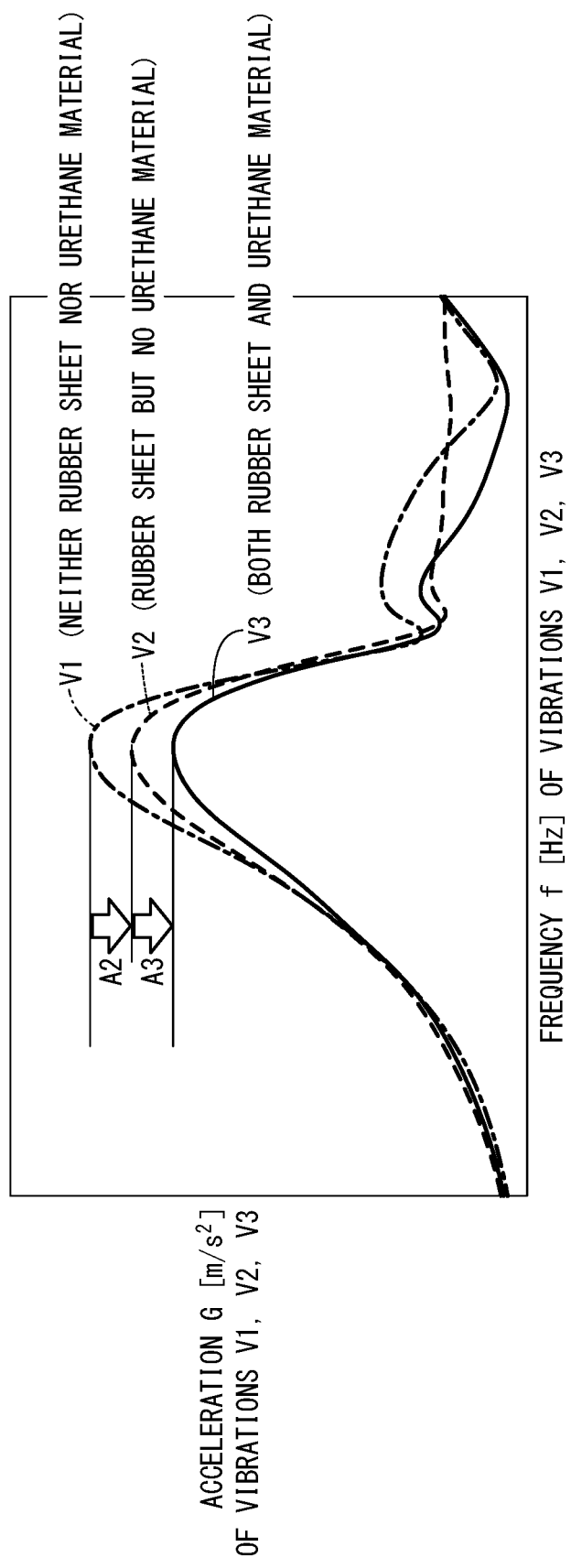
FIG. 7 is a view showing vibration characteristics corresponding to a first comparative workpiece and a second comparative workpiece, and to the workpiece of FIGS. 6A and 6B.

The testing device 200 includes a weight 230, an acceleration sensor 232, a hammering point 234, a hammer 236, and a surface table 238. The weight 230 is disposed on each of the workpiece 202, the first comparative workpiece, and the second comparative workpiece. The acceleration sensor 232 and the hammering point 234 are disposed on the weight 230. In this state, a vibration V (hereafter, also called a "vibration V3") when the hammering point 234 is struck by the hammer 236 along the front-rear direction (a direction of arrow A in FIG. 6A), is detected by the acceleration sensor 232. The first comparative workpiece and the second comparative workpiece also have their vibrations V (hereafter, also called "vibrations V1, V2") detected by the acceleration sensor 232 by a similar method. FIG. 7 is a view showing characteristics of the vibrations V1, V2, V3 corresponding to the first comparative workpiece, the second comparative workpiece, and the workpiece 202 of FIGS. 6A and 6B. As described above, the vibration V corresponding to the first comparative workpiece is the vibration V1, and the vibration V corresponding to the second comparative workpiece is the vibration V2. Moreover, the vibration V corresponding to the workpiece 202 of FIGS. 6A and 6B is the vibration V3. The horizontal axis of FIG. 7 shows a frequency f [Hz] of the vibrations V1, V2, V3, and the vertical axis of FIG. 7 shows an acceleration G [m/s$^2$] of the vibrations V1, V2, V3. The graph of FIG. 7 is obtained by performing a fast Fourier transform on a detection value of the acceleration sensor 232.

As is clear from FIG. 7, a peak value of the acceleration G is reduced more in the case of the second comparative workpiece (second test elastic member 214 as a rubber sheet present but first test elastic member 210 of urethane material not present) than in the case of the first comparative workpiece (neither first test elastic member 210 of urethane material nor second test elastic member 214 as a rubber sheet present) (refer to arrow A2 of FIG. 7). This is conceivably due to the vibration V having been reduced by the second test elastic member 214 (the rubber sheet).

Moreover, the peak value of the acceleration G is reduced more in the case of the workpiece 202 (both first test elastic member 210 of urethane material and second test elastic member 214 as a rubber sheet present) than in the case of the second comparative workpiece (refer to arrow A3 of FIG. 7). This is conceivably due to the vibration V having been reduced by the first test elastic member 210 (of the urethane material) in addition to the second test elastic member 214 (the rubber sheet).

Therefore, a vibration reduction effect could be said to occur due to employing the first test elastic member 210 and the second test elastic member 214. Such a vibration reduction effect could be achieved also by the third elastic member 54a of the second embodiment. Moreover, a similar effect is assumed to be achieved also for the third elastic members 54, 54b, and 54c, 54d of the first, third, and fourth embodiments.

F. Modified Examples

Note that the present invention is not limited to each of the above-described embodiments, and that a variety of configurations may of course be adopted based on the described content of the present specification. For example, the following configurations may be adopted.

F-1. Application Target

In the first embodiment, the seat 12 is assumed to be applied to the vehicle 10 as a car (FIG. 1). However, for example, from a viewpoint of providing the third elastic member 54 (the rear side elastic member) in addition to the second elastic member 52 (the front side elastic member), the present invention is not limited to this. For example, the vehicle 10 (or means-of-transportation) may be a moving object such as a ship, an aircraft, or the like. Alternatively, it is also possible for the seat 12 to be applied to a position of other than the vehicle 10. The same applies also to the second through fourth embodiments.

F-2. Seat Back Frame 50

The seat back frame 50 of the first embodiment includes the plate-like pressure receiving member 108 (FIG. 1). However, for example, from a viewpoint of supporting the second elastic member 52 (the front side elastic member) and the third elastic member 54 (the rear side elastic member), the present invention is not limited to this. For example, it is also possible for an elastic supporting member such as an S spring to be employed instead of the plate-like pressure receiving member 108 (refer to FIG. 1 of Japanese Laid-Open Patent Publication No. 2005-254962, for example).

F-3. Side Supports 24l, 24la, 24r, 24ra

In the first embodiment, the side supports 24l, 24r are provided (FIG. 1). However, for example, from a viewpoint of providing the third elastic member 54 (the rear side elastic member) in addition to the second elastic member 52 (the front side elastic member), it is also possible for the side supports 24l, 24r to be omitted. The same applies also to the second through fourth embodiments.

What is claimed is:
1. A seat comprising a seat back, the seat back including:
a seat back frame;
a front side elastic member positioned on a user side of the seat back frame;
a pair of rear side elastic members which have a lower resilience than a resilience of the front side elastic member, and which are disposed more rearward than the front side elastic member; and a pressure receiving member disposed behind the rear side elastic members, the pressure receiving member configured to, while being supported by the seat back frame, support the front side elastic member and the rear side elastic members, wherein:

the rear side elastic members are configured to suppress vibrations of the seat back frame or vibrations of the pressure receiving member from being transmitted to the front side elastic member, the pair of rear side elastic members comprises a first rear side elastic member disposed at a first side of a center of the seat back in a width direction, and a second rear side elastic member disposed at a second side of the center of the seat back in the width direction, and a gap is provided between the first rear side elastic member and the second rear side elastic member.

2. The seat according to claim 1, wherein the front side elastic member is formed of a first urethane material having a first resilience, and the rear side elastic members are formed of another urethane material having a lower resilience than the first resilience of the first urethane material of the front side elastic member.

3. The seat according to claim 1, wherein the rear side elastic members comprise at least one rubber sheet.

4. The seat according to claim 1, wherein a plate, which is harder than the front side elastic member and the rear side elastic members, is disposed between the front side elastic member and the rear side elastic members.

5. The seat according to claim 1, wherein the seat comprises a side support disposed at a side of one of the rear side elastic members, and a gap is provided between said one of the rear side elastic members and the side support.

6. The seat according to claim 1, wherein the seat comprises a side support disposed at a side of one of the rear side elastic members, and the side support includes:

a user side elastic member positioned on the user side and having a side support first resilience; and a frame side elastic member which has a lower resilience than the side support first resilience of the user side elastic member, and which is disposed between the user side elastic member and the seat back frame.

7. The seat according to claim 6, wherein the front side elastic member and the user side elastic member are configured from a same material, and the rear side elastic members and the frame side elastic member are configured from a same material.

8. A vehicle comprising a seat having a seat back, the seat back including:

a seat back frame;

a front side elastic member positioned on a user side of the seat back frame;

a pair of rear side elastic members which have a lower resilience than the front side elastic member and which are disposed more rearward than the front side elastic member; and a pressure receiving member configured to, while being supported by the seat back frame, support the front side elastic member and the rear side elastic member at a rear of the rear side elastic members, wherein:

the pair of rear side elastic members are configured to suppress vibrations of the seat back frame or the pressure receiving member from being transmitted to the front side elastic member, the pair of rear side elastic members comprises a first rear side elastic member disposed at one side of a center of the seat back in a width direction, and a second rear side elastic member disposed at another side of the center of the seat back in the width direction, and a gap is provided between the first rear side elastic member and the second rear side elastic member.

9. A seat comprising a seat back, the seat back comprising:

a seat back frame;

a front side elastic member positioned on a user side of the seat back frame and having a first resilience;

a rear side elastic member disposed behind the front side elastic member and having a lower resilience than the first resilience of the front side elastic member; and a pressure receiving member disposed behind the rear side elastic member, the pressure receiving member configured to, while being supported by the seat back frame, support the front side elastic member and the rear side elastic member, wherein:

the rear side elastic members are configured to suppress vibrations of the seat back frame or vibrations of the pressure receiving member from being transmitted to the front side elastic member, the seat comprises a side support disposed at a side of the rear side elastic member, and a gap is provided between the rear side elastic member and the side support, and the front side elastic member abuts against the side support when the seat back is viewed from above.

10. The seat according to claim 9, wherein the side support includes:

a user side elastic member positioned on the user side and having a side support first resilience; and a frame side elastic member which has a lower resilience than the side support first resilience of the user side elastic member, and which is disposed between the user side elastic member and the seat back frame.

11. The seat according to claim 9, wherein the front side elastic member and the user side elastic member are configured from a same material, and the rear side elastic member and the frame side elastic member are configured from a same material.

* * * * *